United States Patent

Conklin et al.

[15] 3,689,654

[45] Sept. 5, 1972

[54] PHARMACEUTICAL COMPOSITIONS

[72] Inventors: John D. Conklin; Edward L. D'Orazio, both of Norwich, N.Y.

[73] Assignee: Morton-Norwich Products, Inc.,

[22] Filed: Sept. 14, 1970

[21] Appl. No.: 72,196

[52] U.S. Cl. ................................................424/273
[51] Int. Cl. .............................................A61k 27/00
[58] Field of Search..............................424/285, 273

[56] References Cited

UNITED STATES PATENTS 3,415,821  12/1968  Davis et al. ................424/273

*Primary Examiner*—Stanley J. Friedman
*Attorney*—Bradford S. Allen

[57] ABSTRACT

The physiologic availability of a muscle relaxant, 1-[5-(p-nitrophenyl)furfurylideneamino]hydantoin, in the form of its sodium salt when administered orally to man in capsule form containing a formulation comprising it, lactose, starch, talc and magnesium stearate is increased at least twofold.

1 Claim, No Drawings

PHARMACEUTICAL COMPOSITIONS

This invention relates to pharmaceutical compositions. More particularly it is related to a pharmaceutical composition in capsule form containing a drug formulation whereby physiologic availability of the drug is increased. Still more particularly it is concerned with the provision of a muscle relaxant, 1-[5-(p-nitrophenyl)furfurylideneamino]hydantoin in the form of its sodium salt, composed in capsule form in a formulation consisting of lactose, starch, talc and magnesium stearate.

The compound 1-[5-(p-nitrophenyl)furfurylideneamino]hydantoin and its utility as a muscle relaxant are described in U.S. Pat. No. 3,415,821. Also pointed out in that patent is the formulation of that compound in various pharmaceutical compositions including capsules.

It has been unexpectedly discovered that when 1-[5-(p-nitrophenyl)furfurylideneamino]hydantoin in the form of its sodium salt is admixed with lactose, starch, talc and magnesium stearate and that composition placed in a gelatin capsule for oral administration to man at least a twofold increase in physiologic availability of drug is achieved. Exemplary of such a formulation is the following:

| Ingredient | Amount per Capsule |
| --- | --- |
| Sodium 1-[5-(p-nitrophenyl)furfurylideneaminognhydantoin | 25–100 mg. |
| Lactose | 126–232 mg. |
| Starch | 20–35 mg. |
| Talc | 10–20 mg. |
| Magnesium Stearate | 5–10 mg. |

In preparing such formulation conventional pharmaceutical compounding techniques are employed, the drug being intimately dispersed in the excipients by grinding, stirring or blending.

When sodium 1-[5-(p-nitrophenyl)furfurylidenanino]hydantoin administered to man in a single dose of 25 mg. or 75 mg. and is similarly administered without excipients, the following results are obtained on analysis of the urine and blood of the recipient using a method for detecting dantrolene described in Arch. Int. Pharmacodyn. 174:333, 1968:

TABLE I

Human Blood Drug Concentrations Following Oral Administration of Sodium 1[5-(p-nitrophenyl)furfurylideneamino]hydantoin (Pure Drug vs. Formulation)

Blood Drug Conc. mcg/ml*

| Drug-Dose | 1.5 hr | 3.0 hr | 4.5 hr | 6.0 hr | 7.5 hr | 9.0 hr | 10.5 hr | 12.0 hr |
| --- | --- | --- | --- | --- | --- | --- | --- | --- |
| Pure Drug 25 mg | <0.01 | <0.04 | 0.09 | 0.10 ±0.05 | <0.09 | <0.09 | <0.09 | <0.07 |
| Formulation 25 mg | 0.13 ±0.09 | 0.28 ±0.12 | 0.30 ±0.11 | 0.28 ±0.13 | 0.25 ±0.14 | 0.23 ±0.13 | 0.21 ±0.13 | 0.16 ±0.11 |
| Pure Drug 75 mg | <0.09 | 0.22 ±0.19 | 0.36 ±0.19 | 0.37 ±0.20 | 0.33 ±0.18 | 0.35 ±0.17 | 0.33 ±0.18 | 0.27 ±0.17 |
| Formulation 75 mg | 0.85 ±0.37 | 0.78 ±0.42 | 0.48 ±0.04 | 0.80 ±0.42 | 0.90 ±0.38 | 0.75 ±0.32 | 0.70 ±0.33 | 0.58 ±0.28 |

*Sodium 1-[5-( p-nitrophenyl)furfurylideamino] hydantoin Equivalents Mean value ± S.D. for 12 subjects.
<Below sensitivity of method ( 0.1 mcg/ml).

Table II

Urinary Drug Recoveries Following Oral Administration of Sodium 1-[5-(p-nitrophenyl)furfurylideneamino]hydantoin (Pure Drug vs. Formulation)

| | % Urinary Drug Recovery 0–48 hours* | | | | Mean for Two Doses (25–75 mg)/Volunteer | |
| --- | --- | --- | --- | --- | --- | --- |
| | Pure Drug | | Formulation | | | |
| subject | 25 mg | 75 mg | 25 mg | 75 mg | pure drug | formulation |
| AP | 10.2 | 5.0 | 19.8 | 14.2 | 7.6 | 17.0 |
| JB | 5.0 | 3.6 | 10.6 | 7.4 | 4.3 | 9.0 |
| JU | 5.8 | 3.5 | 19.1 | 10.2 | 4.6 | 14.6 |
| JH | 3.8 | 9.9 | 15.9 | 16.9 | 6.8 | 16.4 |
| PA | 8.2 | 8.9 | 16.5 | 15.9 | 6.8 | 16.2 |
| RF | 8.7 | 4.9 | 10.6 | 9.7 | 6.8 | 10.1 |
| CD | 9.2 | 10.6 | 22.4 | 13.4 | 9.9 | 17.9 |
| ER | 5.3 | 6.6 | 15.8 | 10.7 | 5.9 | 13.2 |
| DA | 5.0 | 5.7 | 11.1 | 8.1 | 5.3 | 9.6 |
| DH | 12.2 | 11.1 | 19.2 | 14.3 | 11.6 | 16.7 |
| JC | 5.0 | 3.4 | 9.5 | 6.3 | 4.2 | 7.9 |
| FA | 16.5 | 4.9 | 10.2 | 21.2 | 10.7 | 15.7 |
| Mean | 7.9 | 6.5 | 15.0 | 12.3 | | |
| ± S.D. | 3.7 | 2.8 | 4.5 | 4.4 | | |

* Calculated on the basis of sodium 1-[5-( p-nitrophenyl)furfurylideneamino]hydantoin dosed.

The capsules employed in the foregoing tests contained the following in addition to sodium 1-[5-(p-nitrophenyl)furfurylideneamino]hydantoin sodium:

| | 25 mg. Capsule | 75 mg. Capsule |
| --- | --- | --- |
| Lactose | 170 mg. | 207 mg. |
| Starch | 25 mg. | 20 mg. |
| Talc | 10 mg. | 10 mg. |
| Magnesium stearate | 5 mg. | 5 mg. |

The surprising enhancement of the physiologic availability of dantrolene sodium as represented in the foregoing tables is not now susceptible of explanation nor is there presently at hand any soundly based theory to account for it.

What is claimed is:

1. A muscle relaxant pharmaceutical composition in capsule dosage form selected from the group consisting of:

a. 
| | |
| --- | --- |
| Sodium 1-[5-(p-nitrophenyl)furfurylideneaminognhydantoin | 25 mg. |
| Lactose | 170 mg. |
| Starch | 25 mg. |
| Talc | 10 mg. |
| Magnesium stearate | 5 mg. | and b.
| | |
| --- | --- |
| Sodium 1-[5-( p-nitrophenyl)furfurylideneaminognhydantoin | 75 mg. |
| Lactose | 207 mg. |
| Starch | 20 mg. |
| Talc | 10 mg. |
| Magnesium stearate | 5 mg. |

* * * * *

PO-1050
(5/69)

UNITED STATES PATENT OFFICE
CERTIFICATE OF CORRECTION

Patent No. 3,689,654  Dated September 5, 1972

Inventor(s) John D. Conklin; Edward L. D'Orazio

It is certified that error appears in the above-identified patent and that said Letters Patent are hereby corrected as shown below:

Column 1, line 30: "nitrophenyl)furfurylideneaminognhydantoin" should be --nitrophenyl)furfurylideneaminohydantoin--
Column 1, line 41: "lidenanino" should be --lidenamino--
Column 1, line 41: after "hydantoin" insert --in the aforesaid capsule formulation is--
Column 1, line 60: Opposite "Pure Drug" and under "3.0" "<0.0" should be -- <0.04--
Column 1, line 64: Opposite "Formulation" and under "6.0" should be entered --0.85--  Opposite "Formulation" and under "7.5" should be entered --0.78--
Column 1, line 65: Strike "0.85" and "0.78"; move "0.75", "0.70" and "0.58" up one line.
Column 2, line 1: Insert an asterisk before "Sodium".
Column 2, line 56: "nitrophenyl)furfurylideneaminognhydantoin" should be --nitrophenyl)furfurylideneaminohydantoin--
Column 2, line 63: "nitrophenyl)furfurylideneaminognhydantoin" should be --nitrophenyl)furfurylideneaminohydantoin--

Signed and sealed this 13th day of February 1973.

(SEAL)
Attest:

EDWARD M. FLETCHER, JR.
Attesting Officer

ROBERT GOTTSCHALK
Commissioner of Patents